United States Patent [19]

Beam et al.

[11] Patent Number: 4,964,606
[45] Date of Patent: Oct. 23, 1990

[54] OVERHEAD MOUNT FOR A CRT

[75] Inventors: Don E. Beam; David C. Wills, both of Cambridge, Ohio; Donald L. Forsythe, Norcross, Ga.

[73] Assignee: NCR Corporation, Dayton, Ohio

[21] Appl. No.: 427,053

[22] Filed: Oct. 26, 1989

[51] Int. Cl.$^5$ ............................................. A47F 7/00
[52] U.S. Cl. .................................... 248/333; 248/423; 248/919; 248/923; 248/188.5; 403/109
[58] Field of Search ............... 248/333, 188.5, 919, 248/920, 921, 922, 923, 406.1, 551, 423, 916, 413; 403/106, 109

[56] References Cited

U.S. PATENT DOCUMENTS

| | | | |
|---|---|---|---|
| 495,409 | 4/1893 | Fry | 248/333 X |
| 1,414,110 | 4/1922 | Bocchio | 403/109 X |
| 2,001,139 | 5/1935 | Johnson | 248/453 |
| 2,713,609 | 7/1955 | Niklason | 248/333 X |
| 3,291,432 | 12/1966 | Lucasey | 248/278 |
| 3,559,942 | 2/1971 | Lucasey | 248/278 |
| 3,637,172 | 1/1972 | Diesbach | 403/104 X |
| 3,662,981 | 5/1972 | Hogrebe | 248/921 X |
| 3,822,051 | 7/1974 | Karapita | 248/333 |
| 3,889,910 | 6/1975 | Walters | 248/291 X |
| 4,025,017 | 5/1977 | Miller | 248/297 |
| 4,127,252 | 11/1978 | Splawn | 248/333 |
| 4,310,136 | 1/1982 | Mooney | 248/278 |
| 4,378,173 | 3/1983 | Hopwell | 248/188.5 X |
| 4,516,751 | 5/1985 | Westbrook | 248/276 |
| 4,566,663 | 1/1986 | Barchus | 248/324 |

Primary Examiner—Karen J. Chotkowski
Attorney, Agent, or Firm—Wilbert Hawk, Jr.; Albert L. Sessler, Jr.; Richard W. Lavin

[57] ABSTRACT

There is disclosed a mounting structure for a CRT display which includes a pair of tubular support members with the first one secured to a ceiling surface and the second one slidably mounted within the first one. Knobs are included to lock the second support member in an adjusted position within the first support member. A yoke assembly secured to one end of the second tubular support member includes a yoke member secured to the support member, a tray member rotatably secured to the yoke member for supporting the display and adapted to be rotated to an adjusted position, a strap member secured to the yoke member for holding the display on the tray member and a locking knob for locking the tray member in the adjusted position.

6 Claims, 6 Drawing Sheets

FIG. 10
FIG. 11
FIG. 12
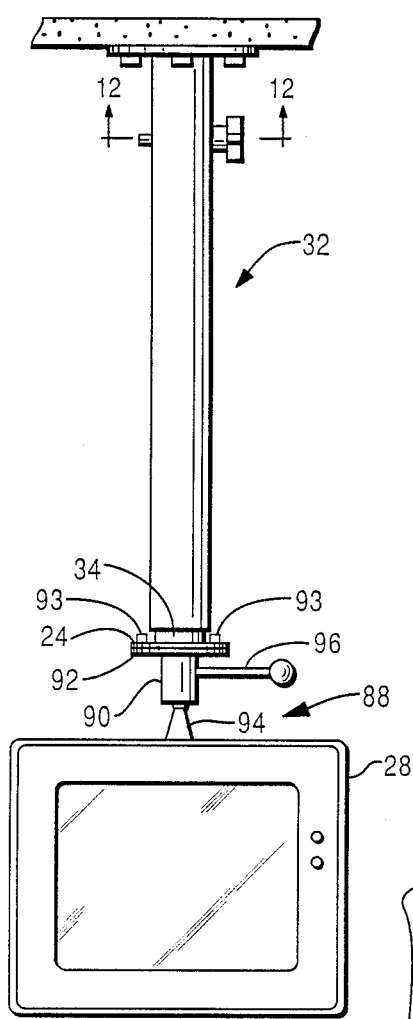
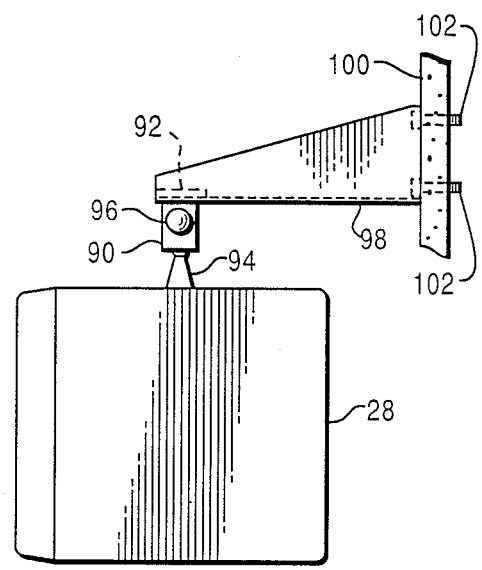
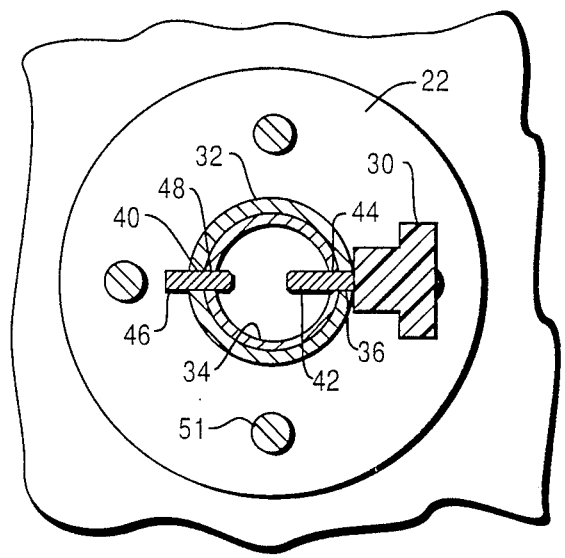

4,964,606

OVERHEAD MOUNT FOR A CRT

BACKGROUND OF THE INVENTION

The present invention relates to an adjustable support assembly for an article such as a CRT display member or the like which allows the member to be mounted in any number of positions for viewing at eye level or above.

In present day fast food installations, the food order is taken at the checkout station and transmitted to the kitchen where it is displayed on a CRT display and read by the kitchen personnel. Prior installations have mounted the CRT display on a worktable where it was found that it took up critical work space or on the wall where it has been found that it was hard to read due to the movement of the kitchen personnel past the display because of the limited space in the kitchen.

SUMMARY OF THE INVENTION

In accordance with one embodiment of the invention, there is provided a mounting or support structure for securing a CRT display member to the ceiling which includes a yoke assembly secured to a column support assembly for supporting the CRT member. The yoke assembly includes a strap member which engages the top portion of the CRT member for securing the CRT member to the yoke assembly. The column support assembly includes a first tubular member having one end secured to the ceiling and which includes a pair of vertical slots and a second tubular member slidably positioned within the first tubular member. The second tubular member includes a pair of threaded apertures which cooperate with the vertical slots in the first member to accommodate a locking knob member and a guide stud for locking the second tubular member in a plurality of vertical positions within the first tubular member. The second tubular member has a flange portion which is secured to the yoke assembly. The flange portion includes a plurality of curved slots for locating the yoke assembly and the CRT in a plurality of horizontal positions. A second locking knob engages the yoke assembly and the CRT member to rotate the CRT member to a number of positions around the yoke assembly. In a second embodiment of the invention, the yoke assembly is replaced by a ball pivot member with an adjusting arm to rotate or tilt the CRT to an operating position. In a third embodiment of the invention, the CRT may be secured to a side wall by means of a bracket.

It is therefore a principal object of this invention to provide a mounting structure for mounting a display from the ceiling which can be easily adjusted in both the vertical and horizontal direction to vary the viewing position of the display.

It is another object of the invention to provide a mounting structure for a CRT display member which is simple in construction and low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanied drawings wherein like reference numerals indicate like or corresponding parts throughout the several views and wherein:

FIG. 10 is a front plan view of a second embodiment of a mounting structure for a CRT display unit shown supporting the display unit from the ceiling;

FIG. 11 is side view of a third embodiment of a mounting structure for a CRT display unit shown supporting the display unit from a side wall; and FIG. 12 is a sectional view of the column assembly taken on line 12—12 of FIG. 3 showing details of the locking knob and the guide pin when mounted in the column assembly.

DESCRIPTION OF THE PREFERRED EMBODIMENT

Figure 1:
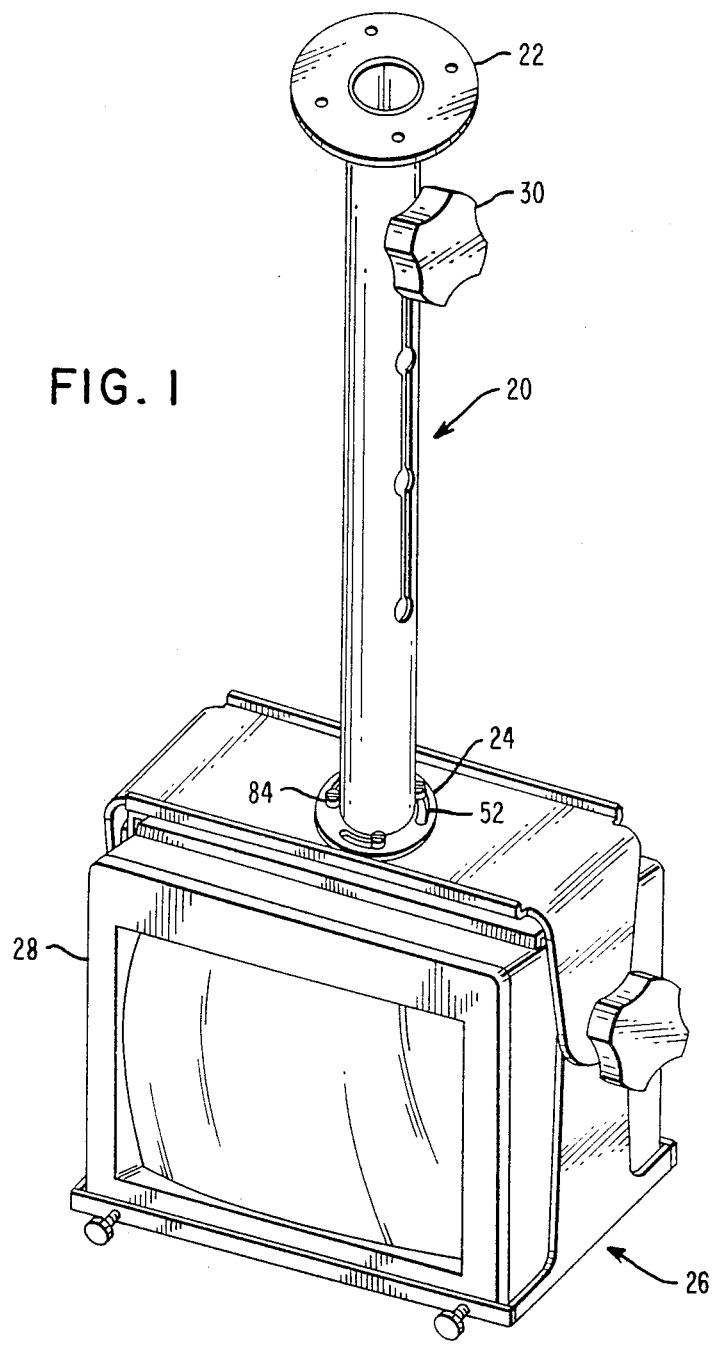
FIG. 1 is perspective view of one embodiment of the mounting structure for a CRT display unit of the present invention shown supporting the display unit from the ceiling.
Figure 3:
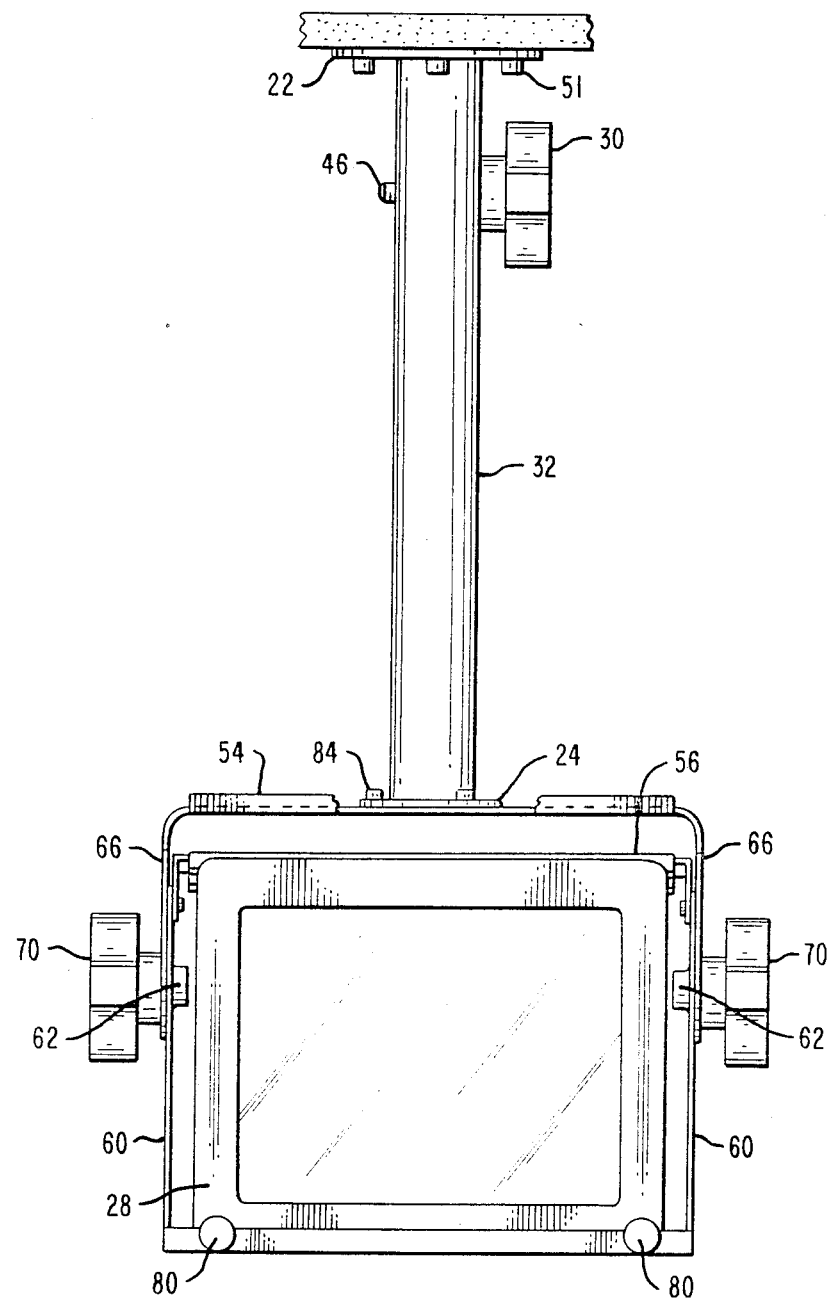
FIG. 3 is a front plan view of the mounting structure of FIG. 1.
Figure 4:
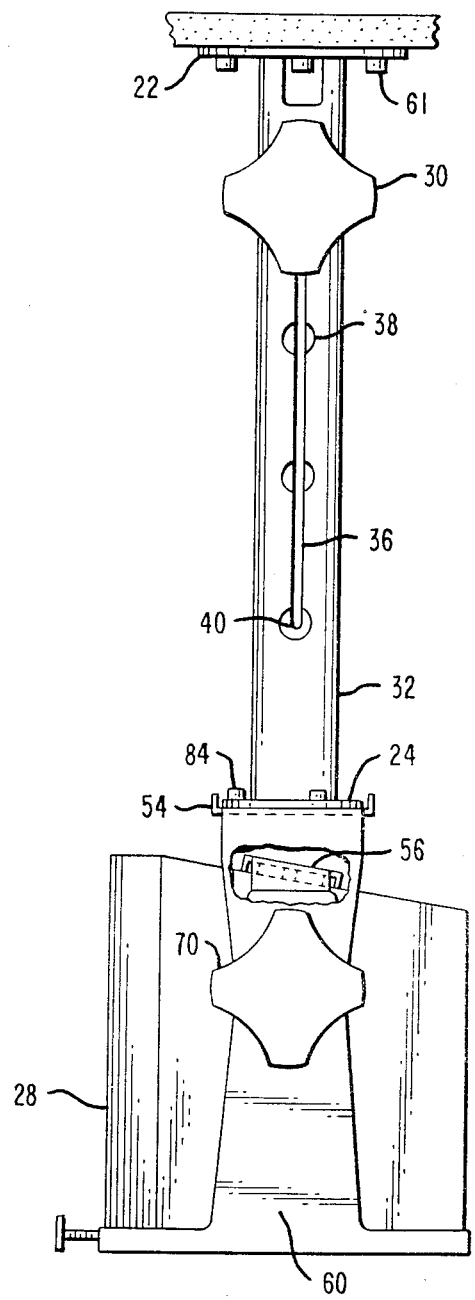
FIG. 4 is a side plan view of the mounting structure of FIG. 1.

Referring now to FIG. 1, there is shown a perspective view of the mounting structure of the present invention for supporting a CRT display unit which includes a column support assembly generally indicated by the numeral 20 having a first flange portion 22 for use in mounting the assembly 20 to the ceiling and a second flange portion 24 which is secured to a yoke assembly generally indicated by the numeral 26. Mounted within the yoke assembly 26 is a CRT display unit 28 (FIGS. 3 and 4). As will be described hereinafter, the support assembly 20 includes a pair of nested tubular members one of which is slidably moved to position the CRT display unit in the desired location. A star-shaped locking knob 30 is employed to lock the tubular members in an adjusted position as will be explained more fully hereinafter.

Figure 2:
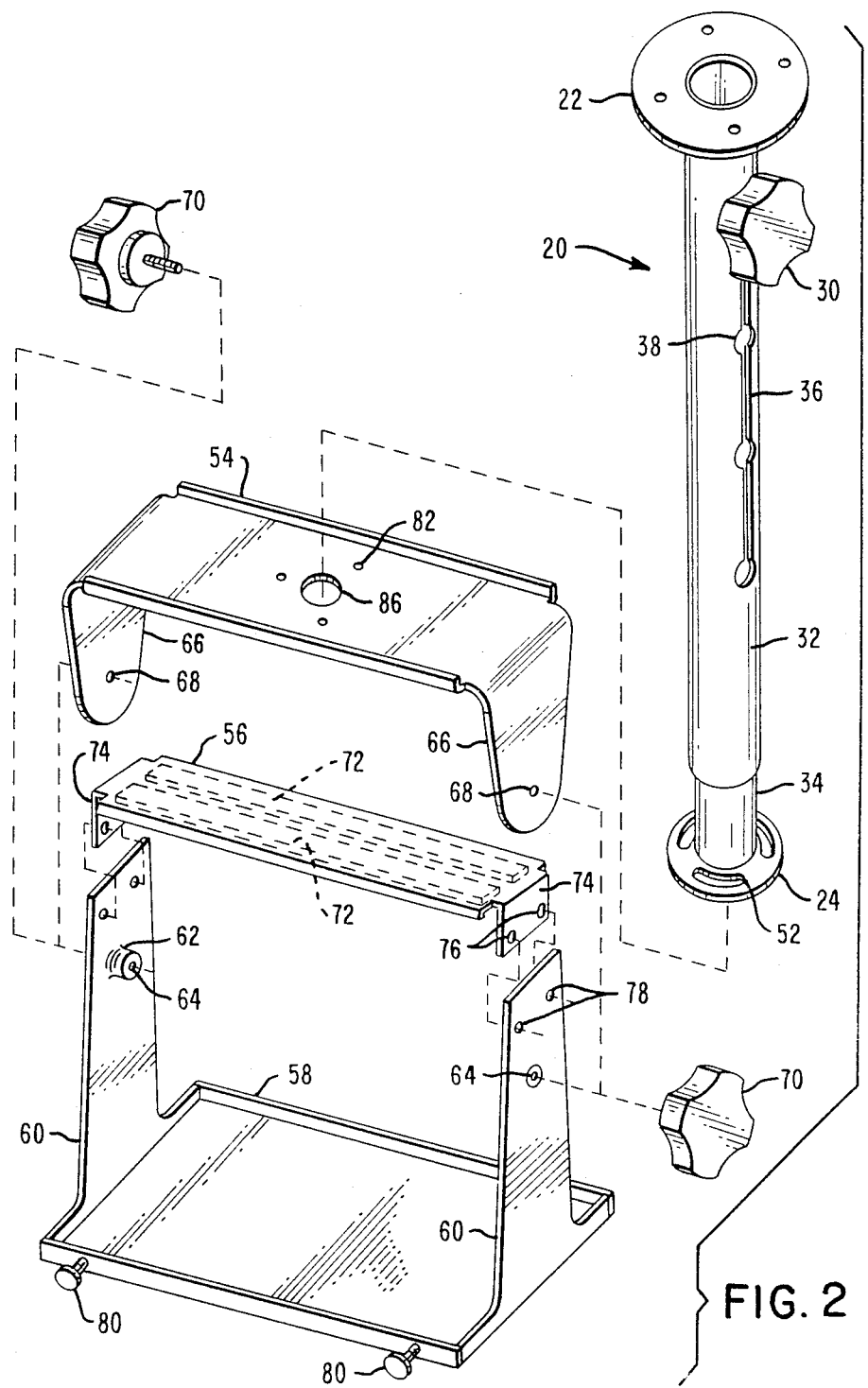
FIG. 2 is an exploded view of the mounting structure of FIG. 1.
Figure 5:
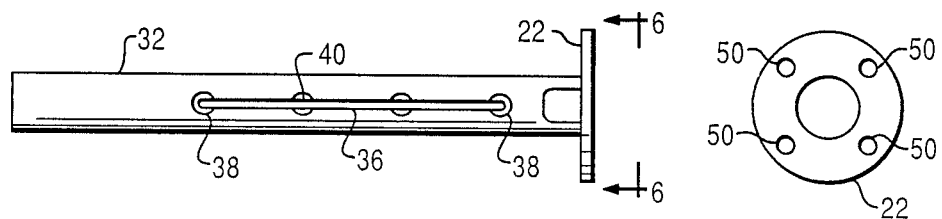
FIG. 5 is a side view of the outer tubular member showing the slot and the aperture portions which accommodate the locking knob for use in selecting the vertical position of the display unit.
Figure 6:
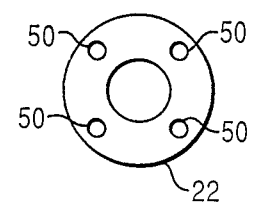
FIG. 6 is a view taken on line 6—6 of FIG. 5 showing details of the flange portion of the outer tubular member.
Figure 7:
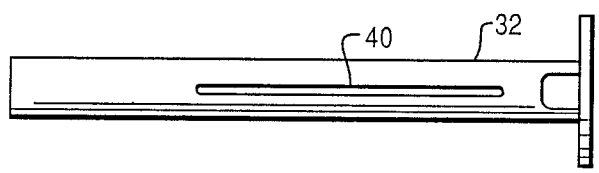
FIG. 7 is a side view of the outer tubular member taken on the side opposite from the side shown in FIG. 5 showing the slot which accommodates the guide pin.
Figures 8, 9:
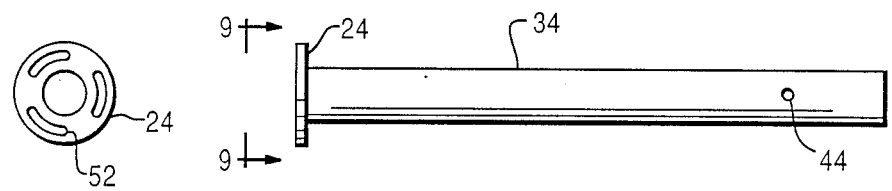
FIG. 8 is a side view of the inner tubular member showing the location of the threaded hole in which is located the guide pin.
FIG. 9 is a view taken on line 9—9 of FIG. 8 showing details of the flange portion of the inner tubular member.

Referring to FIG. 2, there is shown an exploded view of the mounting structure of FIG. 1 in which the column support assembly 20 includes an outer hollow tubular member 32 (FIGS. 5, 7 and 12) having one end terminating in the flange portion 22. Slidably mounted within the tubular member 32 is an inner tubular member 34 having one end terminating in the flange portion 24. As best seen in FIGS. 4, 5 and 7, one side of the tubular member 32 includes an elongated slot 36 extending along the long axis of the tubular member interspersed with a plurality of apertures 38. Located on the opposite side of the tubular member 32 and in registry with the slot 36 (FIG. 5) is a second slot 40. As best shown in FIG. 12, to lock the inner tubular member 34 in an adjusted position within the outer tubular member 32, the locking knob 30 (FIGS. 1 and 2) which has a threaded end 42 is inserted through one of the apertures 38 (FIG. 5) and screwed into a threaded hole 44 (FIG. 8) located in the inner tubular member 34. In order to prevent any rotational movement of the knob member 30 within the slot 36, a guide pin 46 (FIG. 12) is inserted into the slot 40 (FIG. 7) in the outer tubular member 32 and screwed into a threaded hole 48 in the inner tubular member 34 in line with the hole 44. As seen in FIG. 6, the flange portion 22 includes four holes 50 enabling the outer tubular member 32 to be secured to the ceiling by the bolts 51 (FIGS. 3, 4 and 12). The flange portion 24 (FIGS. 2 and 9) has a plurality of curved slots 52 enabling the inner tubular member 34 to be rotated when secured to a supporting surface.

The yoke assembly 26 (FIGS. 1 and 2) comprises a yoke member 54, a strap member 56 and a support member 58. The support member 58 which may be constructed of aluminum or stainless steel includes a pair of upstanding arm portions 60 (FIG. 3) which include a boss portion 62 extending outwardly from the inside surface of each of the arm portions 60. A threaded hole 64 is drilled through each of the boss portions. The yoke member 54 which may be constructed of aluminum or stainless steel has a pair of depending arm portions 66 (FIGS. 3 and 4) each of which includes a hole 68 which is positioned in registry with the threaded hole 64 in the support member when the yoke member is positioned on the display unit 28 (FIG. 1). An adjusting knob 70 which is similar in construction to the locking knob 30 (FIG. 1) is inserted through the hole 68 in each of the arm portions 66 and into the hole 64 in the support member 58 to lock the display unit 28 in a rotated position about the threaded hole 64.

Positioned around the top of the display unit 28 is the strap member 56 which may be constructed of aluminum and includes a pair of rubber strips 72 (FIGS. 2 and 3) glued to the undersurface of the strap member. The strap member includes a pair of turned down end portions 74 in which are located a pair of slots 76 which are positioned in registry with a pair of holes 78 located in the arm portions 60 of the support member 58 enabling the strap member to be secured to the support member by any type of fastening means such as screws. The slots 76 in the end portions 74 allow the strap member 56 to accommodate various CRT configurations. The support member 58 includes a pair of adjusting screws 80 (FIGS. 2–4 inclusive) which are used to position the display unit 28 on the support member. The yoke member 54 includes a plurality of holes 82 which receive the bolts 84 (FIG. 1) through the slots 52 for securing the flange portion 24 of the inner tubular member 34 (FIG. 9) to the yoke member. As shown in FIG. 1, the curved slots 52 allow the display unit 28 to be rotated to a viewing position after the column support assembly 20 has been mounted to the ceiling. The yoke member 54 further includes an aperture 86 through which electrical cables from the display unit 28 may be routed through the column support assembly 20 (FIG. 1) and into the ceiling.

Referring to FIG. 10, there is shown a second embodiment of the mounting structure of FIG. 1 in which the yoke assembly 26 has been replaced by a ball pivot assembly generally indicated by the numeral 88 which includes a housing member 90 having a plate portion 92 to which is secured the flange portion 24 of the support assembly 2 by bolts 93. Rotatably mounted in the housing member 90 in a manner that is well known in the art is a ball member (not shown) having an extension portion 94 secured to the display unit in any conventional manner. Secured to the ball member is an adjusting arm 96 used to rotate the display unit to any desired position and for locking the display unit in the adjusted position in a manner that is well known in the art.

Referring to FIG. 11, there is shown a third embodiment of the present invention in which the column support assembly 20 of FIG. 10 has been replaced by a U-shaped side wall bracket 98 which is secured to the plate portion 92 of the ball pivot assembly 88 (FIG. 10) in any conventional manner such as bolts. The bracket 98 may be secured to a side wall 100 by means of bolts 102.

It will be seen that the mounting structure of the present invention allows the CRT display to be easily adjusted to a plurality of viewing positions where the work environment is a small kitchen including a plurality of cooking elements hanging from the ceiling.

While the principles of the invention have been made clear in an illustrated embodiment, it will be obvious to those skilled in the art that many modifications of structure, arrangements and components can be made which are particularly adapted for specific environments and operating requirements without departing from those principles. The appended claims are therefore intended to cover and embrace any such modifications, within limits only of the true spirit and scope of the invention.

What is claimed is:

1. An apparatus for vertically adjustably mounting a device from the ceiling comprising:
   a pair of elongated support members one of which is slidably mounted within the other, said other one of said support members being secured to a ceiling surface;
   support means secured to said one of said pair of support members for supporting a device in an adjusted position;
   said one of said support members including a first and a second slot extending along the long axis of the member and a plurality of first apertures intersecting said first slot;
   said other of said support members including a second and a third aperture;
   a locking member positioned in said second slot and within one of said first apertures and within said second aperture upon movement of said one of said pair of support members to a position within the other of said pair of support members to align one of said first aperture with said second aperture locking the support members and the device in the adjusted position, said third aperture being aligned with said second slot when said locking member is mounted in said second slot and one of said first apertures; and
   said apparatus further including guide means positioned in said third aperture and said second slot for holding the support members and the device in the adjusted position.

2. The apparatus of claim 1 in which said support means includes a yoke member secured to said one of said elongated support members, a tray member rotatably secured to said yoke member for fully engaging and supporting the device and a strap member engaging the device and secured to said yoke member for holding the device on the tray member, said tray member being rotated to an adjusted position for orientating the device in an operating position.

3. The apparatus of claim 2 which further includes a manually operated second locking member engaging the yoke member and the tray member for easily locking the tray member and the device in the adjusted position.

4. An apparatus for adjustably mounting a CRT display to a supporting surface comprising:
 a first tubular support member having one end secured to a supporting surface;
 a support assembly for supporting the display;
 a second tubular support member slidably mounted within the first tubular support member and having one end secured to the support assembly;
 said first tubular support member having a first and second slot extending along the long axis of the support member and a plurality of first apertures intersecting the first slot;
 said second tubular support member including first and second threaded apertures;
 a first locking knob having a threaded end for insertion into one of said first apertures and into engagement with such first threaded aperture upon movement of the second support member to an adjusted position within the first support member to align one of said first apertures with the first threaded aperture for locking the support member and the display in the adjusted position;
 said second threaded aperture being aligned with said second slot when said first locking knob is inserted into engagement with said first threaded aperture; and
 said apparatus further including a threaded guide pin mounted in said second threaded aperture and said second slot for holding the first and second tubular support members and the display in the adjusted position.

5. The apparatus of claim 4 in which said support assembly includes a yoke member secured to one end of the second tubular support member, a tray member for fully engaging and supporting the CRT display and rotatably secured to the yoke member for movement around the yoke member to an adjusted position and a second locking knob engaging said tray member and said yoke member and which is manually operated for easily locking the tray member and the CRT display in the adjusted position.

6. The apparatus of claim 5 in which the support assembly includes a metal strap member engaging the top portion of the CRT display and secured to the yoke member, said strap member including a flexible member secured to the strap member and engaging the display for holding the display on the support member.

* * * * *